United States Patent
Dietrich et al.

(10) Patent No.: US 6,860,705 B1
(45) Date of Patent: Mar. 1, 2005

(54) AUTO-LOCK TOOL MOUNTING SYSTEM

(75) Inventors: Steven L. Dietrich, Jackson, MI (US); James R. Kalb, Petersburg, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 625 days.

(21) Appl. No.: 09/594,255

(22) Filed: Jun. 15, 2000

Related U.S. Application Data

(60) Provisional application No. 60/144,958, filed on Jul. 21, 1999.

(51) Int. Cl.$^7$ ................................................. B23Q 3/00
(52) U.S. Cl. ......................... 414/680; 414/723; 483/8; 483/9; 483/901; 483/902; 901/41
(58) Field of Search ........................ 414/749.1, 751.1, 414/723, 680; 483/8, 9, 7, 901, 902; 901/15, 41

(56) References Cited

U.S. PATENT DOCUMENTS

| | | | | |
|---|---|---|---|---|
| 4,319,864 A | * | 3/1982 | Kaufeldt | 414/751.1 |
| 4,783,904 A | * | 11/1988 | Kimura | 901/15 X |
| 4,881,867 A | * | 11/1989 | Essex et al. | 414/723 |
| 4,913,617 A | * | 4/1990 | Nicholson | 901/29 X |
| 4,922,591 A | * | 5/1990 | Campbell | 483/902 X |
| 5,692,325 A | * | 12/1997 | Kuzutani | 414/723 X |
| 5,733,097 A | * | 3/1998 | Herbermann et al. | 414/752 |
| 5,779,609 A | * | 7/1998 | Cullen et al. | 483/901 X |

* cited by examiner

Primary Examiner—Donald W. Underwood
(74) Attorney, Agent, or Firm—Carlson, Gaskey & Olds

(57) ABSTRACT

A mounting system for mounting tools to a base includes a movable base, a tool mounting frame for selective attachment to the base, and a locking assembly movable between a locked position where the tool mounting frame is securely attached to the base and an unlocked position where the tool mounting frame is movable relative to the base. The tool mounting frame includes at least one tool mount for supporting a first tool to perform a tooling operation after the locking assembly is moved to the locked position. The locking assembly includes a first mount supported by the base and a second mount supported by the tool mounting. The locking assembly is automatically interlocks the first and second mounts. A first sensor component is mounted to the base and a second sensor component is mounted to the tool mounting frame. A controller controls mounting speed based on the proximity of the sensor components. Additionally, a code corresponding to the type of tool mounting frame may be used. The tool mounting frame is attached to the base only if the code is appropriate. This feature has benefits beyond automatically mounted tools.

28 Claims, 3 Drawing Sheets

AUTO-LOCK TOOL MOUNTING SYSTEM

RELATED APPLICATION

This application claims priority to provisional application Ser. No. 60/144,958 filed on Jul. 21, 1999.

BACKGROUND OF THE INVENTION

This application relates generally to a tool mounting system that automatically locks a tool mounting frame carrying a plurality of tool members to a movable base.

In the prior art, it is known to use cross-bars or rails to move a plurality of tools between different positions. The tools are often used to hold or mount a work-piece on which a machining operation is to be performed, and the cross-bar moves the work-piece between various stamping operations. The cross-bar may pick up the work-piece at a first work station and move the work-piece to a second work station, for example.

In the prior art, tool mounting frame members that can hold a plurality of tools have been mounted to the cross-bar. One cross-bar has the capability of holding different types of tool mounting frame members to accomplish different tooling operations. These tool mounting frame members are manually attached to the cross bar. A lever mechanism is manually activated to lock a certain tool mounting frame member to a cross-bar. When another tool mounting frame member has to be mounted to the cross bar, the first tool mounting frame must first be manually detached from the cross-bar. The second tool mounting frame member must then be mounted to the cross-bar and manually locked into place.

There are several disadvantages with these prior art systems. The manual attaching of the tool mounting frame members to the cross-bar is time consuming. Operators can forget to manually lock the frame member to the cross-bar, which can lead to damage of the work piece or the tools. Detaching one tool mounting frame member to replace it with another tool mounting frame member is also time consuming. Also, operators can attach the wrong tools to the cross-bar, which can damage the work piece and/or require additional assembly time to replace the incorrect tools with the proper tools.

Thus, systems have been proposed that automatically select the tool mount. However, the details of any such system have not been developed. It is desirable to have a mounting system that can select tool mounting frame members and attach them to cross-bars such that the frame member and the cross-bar are automatically locked together. It is also desirable to have a mounting system that allows only certain tool mounting frame members to be attached to certain cross-bars.

SUMMARY OF THE INVENTION

In general terms, a mounting system for mounting tools on a base includes a movable base, a tool mounting frame for selective attachment to the base, and a locking assembly movable between a locked and unlocked position. In the locked position the tool mounting frame is securely attached to the base and in the unlocked position the tool mounting frame is movable relative to the base. The tool mounting frame includes at least one tool mount for supporting a first tool to perform a tooling operation once the locking assembly is in the locked position. The locking assembly includes a first mount supported by the base, a second mount supported by the tool mounting frame, and an actuator for automatically interlocking the first and second mounts.

In one preferred embodiment, the movable base has a first sensor component and the tool mounting frame includes a second sensor component. One of the two components preferably emits a signal carrying code information, such as mechanical coding for example. The other component reads the signal. A controller is used to selectively mount the tool mounting frame to the base only when the read code indicates the appropriate frame is associated with the movable base. The technology for the sensor components is known. It is the application that is inventive. This ensures that the wrong tools are not mounted to the base.

In another preferred embodiment, a first sensor component is mounted to the movable base and a second sensor component is mounted to the tool mounting frame. One of the two components is preferably a proximity sensor. A controller is used for selectively mounting the tool mounting frame to the base, and monitors proximity of the first and second sensor components to ensure proper alignment of the components.

The subject invention offers several advantages over prior art systems because it provides a quick and efficient method and apparatus for mounting tool holding frame members to a base member. The automatic locking feature ensures that the frame member is securely locked to the base member. The sensor components on the frame and base allow the controller to efficiently control the mounting process.

Also, the coding features ensure that only certain tool holding frames are mounted to certain bases. This prevents the wrong tools from being used to perform a tooling operation on a work piece. The coding features have application beyond the automatically mounted systems. In fact, the coding feature extends to manually mounted systems, and can provide feedback of an improperly mounted tool frame, or manual selection of an incorrect tool frame.

These and other features and advantages of the present invention will be best understood from the following specification and drawings, the following of which is a brief description.

DETAILED DESCRIPTION OF THE PREFERRED EMBODIMENT

Figure 1:
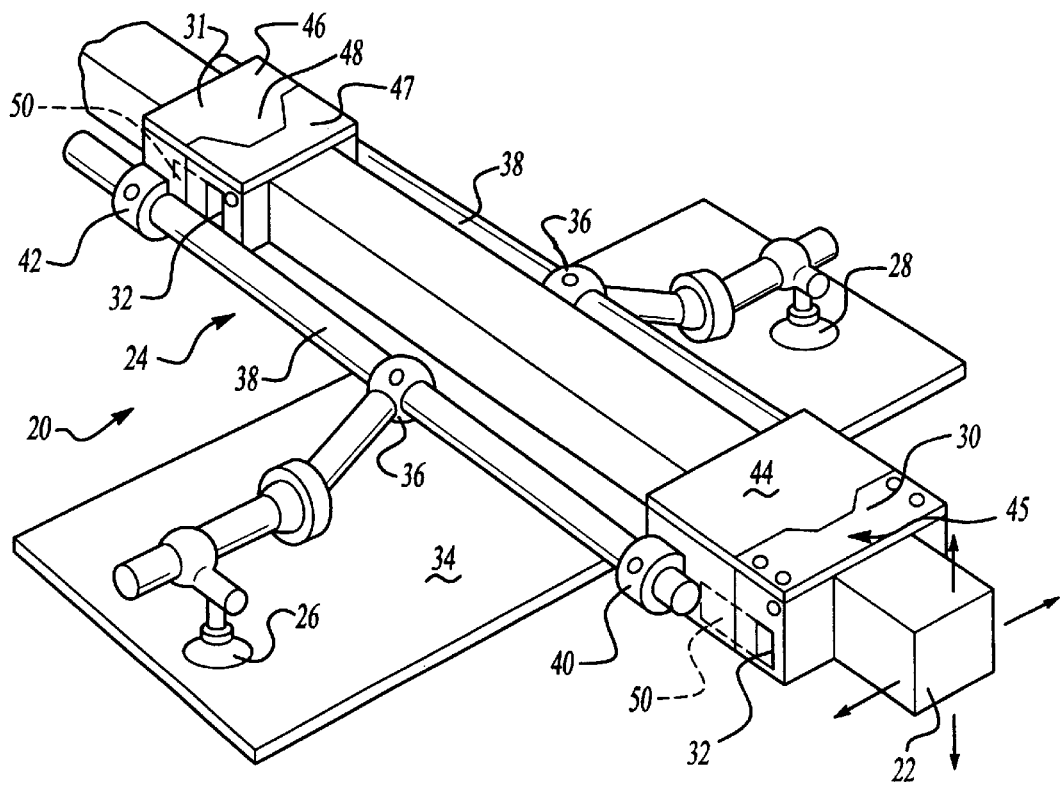
FIG. 1 is a perspective view of a mounting system incorporating the subject invention.

FIG. 1 illustrates an inventive tool mount system 20 for use with a moving cross-bar or rail 22. As shown schematically, cross-bar 22 is of the type which can move vertically and horizontally to reposition parts relative to various work stations. The mounting system 20 incorporates a tool mounting frame 24 including a plurality of tools, such as suction tools 26, 28, for example. The tools hold a part 34 and allow the cross-bar 22 to move the part 34 as desired. As shown, clamp members 36 mount the tools to rails 38. The rails 38 extend between brackets 40, 42 associated with a forward 30 and rear 31 end of frame 24. The rails 38 extend longitudinally along lateral sides of the cross-bar 22 with each of the rails 38 supporting a plurality of tool mounts. It should be understood that rails 38 allow the mounting of tools 26, 28 at any axial location between the forward 30 and rearward 31 ends.

While a particular tool mounting frame and base are shown, aspects of the invention extend to other types of frames and bases. The basic structure of such a cross-bar mount is shown in U.S. Pat. No. 5,733,097, as an example. The use of automatic locking of the frame, as described below, is the inventive feature here.

The frame 24 is securely attached to the cross-bar 22 by a locking assembly 50, shown schematically in FIG. 1, movable between a locked and unlocked position. In the locked position the tool mounting frame 24 is securely attached to the cross-bar 22 and in the unlocked position the tool mounting frame 24 is movable relative to the cross-bar 22. The locking assembly 50 includes a first mount 45, 47 supported by the cross-bar, a second mount 44, 46 supported by the tool mounting frame 24, and an actuator 32, shown schematically, for automatically interlocking the first 45, 47 and second mounts 44, 46.

Figure 2:
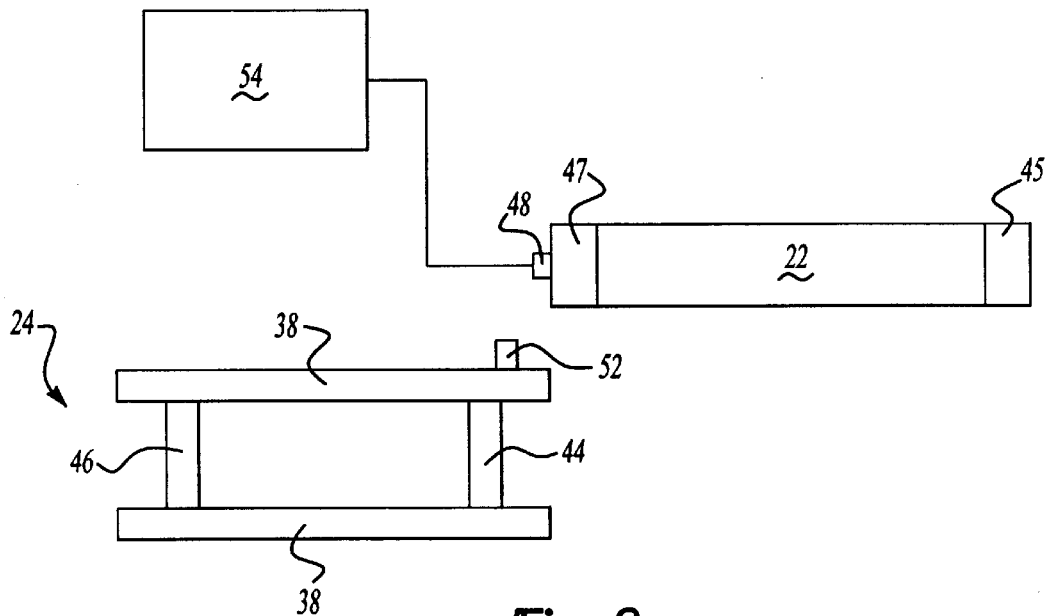
FIG. 2 is a schematic view of the mounting system and sensor components.

FIG. 2 schematically illustrates the tool mounting system 20 described above. In one preferred embodiment, the movable cross-bar 22 has a first sensor component 48 and the tool mounting frame 24 includes a second sensor component 52. One of the two components 48 or 52 carries a pre-determined code that may be sensed by the other component 48 or 52. Here the component 48 is shown as the sensor and the component 52 emits the code. A controller 54 is used to selectively mount the tool mounting frame 24 to the cross-bar 22 only when the first sensor component 48 reads an appropriate code. This ensures that the wrong tools are not mounted to the cross-bar 22, and further provides feedback of when the two are properly aligned. The technology for sensing and emitting codes is known, it is the applications disclosed here, which are inventive.

Each cross-bar 22 may have the capability of supporting several different types of tool mounting frames 24. Preferably, the controller 54 is used to select a first tool frame 24 to perform a first tool operation. The first tool frame 24 is mounted to the cross-bar 22 only if the first 48 and second 50 sensor components communicate to the controller 54 that the cross-bar 22 is supporting an appropriate type of tool frame 24. If this condition is satisfied, the first 45, 47 and second 44, 46 mounts are interlocked and the first tool operation is performed. It should be understood that the appropriate technology for moving cross-bar 22 to frame 24 is within the skill of a worker in the robot art. This invention relates to automatic locking and also relates to several types of feedback provided by the components 48, 52.

Once the first tool operation is completed, the controller 54 will signal a tool change and the locking assembly 50 will be moved to the unlocked position and the first tool mounting frame 24 will be detached from the cross-bar 22. If subsequent tooling operations are to be performed, the controller will select a second tool mounting frame 24 and move it toward the cross-bar 22. The second tool mounting frame 24 has its own sensor component with a code designating it as a certain type of tool mounting frame 24. The second tool mounting frame 24 is automatically locked to the cross-bar if the code from the second frame 24 is appropriate. Once the frame 24 and cross-bar 22 are interlocked, the second tool operation is performed. The controller 54 will repeat these steps until all tooling operations in the sequence have been performed.

The first sensor component 48 mounted to the movable cross-bar and the second sensor component 52 mounted to the tool mounting frame 24, are also preferably used to control the speed at which the frame 24 is mounted to the cross-bar 22. The controller 54 is used to control the speed of the tool mounting frame 24 relative to the cross-bar 22 based on proximity of the first 48 and second 52 sensor components. When the first sensor component 48 nears the second sensor component 52, movement of the frame 24 relative to the cross-bar 22 is slowed so that the first 45, 47 and second mounts 44, 46 can be easily interlocked. The controller 54 monitors proximity of the first 48 and second 52 sensor components to ensure proper alignment of the frame 24 and cross-bar 22 components.

The controller 54 and sensor components 48, 51 can also be used to ensure mounting of a specific tool mounting frame 24 to specific mount location. In this method, if an improper tool mounting frame 24 is brought to a particular mount location, the code will not be appropriate. A signal or some mechanism for preventing mounting could be actuated. This feature would extend to manually mounted tools. Further, this would have application in any type of mount structure. While cross-bars are illustrated, any mounts including static mounts will benefit. Further, other type tool mounting frames will benefit from this invention. As one example only, a tool mounting frame and mount as shown in U.S. Pat. No. 5,733,097 may utilize this coding feature.

Figure 3A:
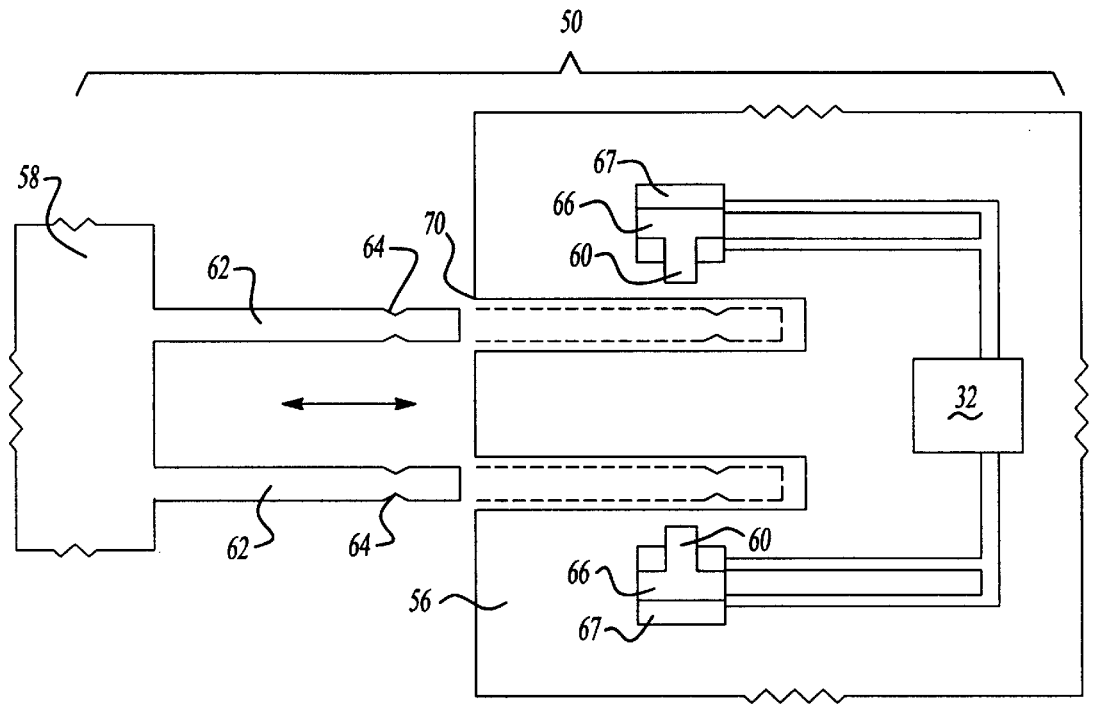
FIG. 3A is a schematic view of the automatic locking components of the mounting system.

The locking mechanism 50 is shown schematically in FIG. 3. The first mount 45, 47 includes a first connector portion 56 and the second mount 44, 46 includes a second connector portion 58. The actuator 32 automatically moves the locking assembly 50 to the locked position when one of the first 56 or second 58 connector portions engages the other of the first 56 or second 58 connector portions.

Preferably, the first connector portion 56 is comprised of at least one fork member 60 and the second connector portion 58 is comprised of at least one pin 62 having an engagement portion 64 for interacting with the fork member 60. The engagement portion 64 is a neck that is narrower in diameter than the pin body. The fork members slide around and engage the neck to hold the pin 62 in place. The fork member 60 includes an angled surface 68, shown in FIG. 4, for drawing the pin 62 into openings 70 the first mount 45, 47 as the first 45, 47 and second 44, 46 mounts are interlocked.

Also, in the preferred embodiment the actuator 32 is a pneumatically controlled piston 66 that is integrally formed with the fork 60. Piston 66 is shown mount ed in a cylinder 67. While a piston 66 is preferred, other actuating mechanisms known in the art could also be used.

Figures 3B, 4:
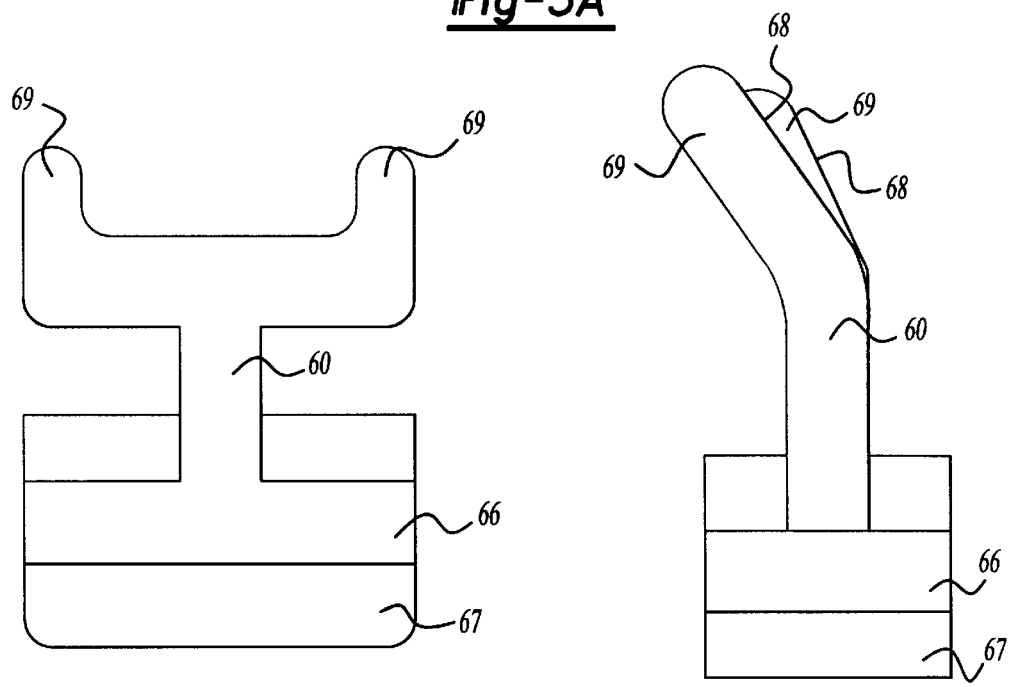
FIG. 3B is an enlarged view of one of the locking components show in FIG. 3A.
FIG. 4 is a perspective view of the component shown in FIG. 3B.

As shown in FIG. 3B, fork 60 has a pair of locking fingers 69, which lock into portions 64.

A method for mounting tools on a base including the steps of providing a movable cross-bar 22 having a first mount 45, 47, mounting a first tool mounting frame 24 having a second mount 44, 46 to the cross-bar 22, and automatically locking the first mount 45, 47 to the second mount 44, 46 to securely hold the tool mounting frame 24 fixed relative to the cross-bar 22.

Before the tool mounting frame 24 is attached to the cross-bar 22, a first tool is attached to the frame 24. Once the frame 24 is locked to the cross-bar 22 a first tool operation is performed with the first tool. The first tool mounting frame 24 is detached after completing the first tool operation and a second tool mounting frame 24 having a second tool different than the first tool is attached to the cross-bar 22. The second tool mounting frame 24 is automatically locked to the cross-bar 22, and a second tool operation is performed with the second tool.

Optional steps include mounting a first sensor component 48 to the movable cross-bar 22, mounting a second sensor component 52 to the first tool mounting frame 24, and controlling the speed of the first tool mounting frame 24 relative to the cross-bar 22 during the mounting process based on proximity of the first 48 and second 52 sensor components. Other optional steps include generating a code representing the first tool mounting frame 24, and mounting the first tool mounting frame 24 to the movable cross-bar 22 only when the code is appropriate.

As discussed above, the coding/identification technique is used to assure that the correct tool mounting frame 24 is attached to the proper cross-bar or rail 22 for the current machining operation. In other words, the identification technique is used to ensure that the correct first connector portion 56 comprised of fingers 69 engages the correct second connector portion 58 comprised of pins 62. The finger 69 can be positioned on either the rail 22 or the tool mounting frame 24 with the pins 62 be located on the other of the rail 22 or tool mounting frame.

In the preferred embodiment, identification is accomplished by each tool mount connector or finger having a unique identification and each mating connector having a unique position along the rail 22. In the preferred embodiment, the tool connector finger has an interface comprised of an eight (8) pin electrical connector. Of the eight pins, a single pin that is seldom used or preferably never used is selected to serve as the one (1) wire interface for that specific rail 22.

The preferred connector is manufactured by Syron Engineering & Manufacturing Corp. and has an extra pin populated in the connector housing to service as the interface. The proximity sensor is connected to the rail 22 through this same connector. It should be understood that a plurality of tool mount fingers can be used to interconnect the tools to the rail 22 and that while each finger does not require a sensor, each finger should have an electrified adapter.

The mating connector on the rail 22 for receiving the eight pin connector is preferably comprised of a five (5) pin micro-connector for a computer bus. As is known in the art, a bus is a set of parallel conductors in a computer system that forms a main transmission path for data throughout the computer system. The bus is preferably designed to communicate directly with a corresponding card located in the controller 54. This will be discussed in greater detail below. The preferred connections for the five pin micro-connector include two (2) wires for the twenty-four (24) volt direct current supply, two (2) wires for communication, and one wire for shielding. These standard connections are well known in the art.

The electronics package can be located in one of the backplates for the mating connectors on the rail, depending on where the fingers and mating connectors are mounted, and can include the interface for the computer bus and the proximity sensor monitor. It is preferred to use the computer bus to transmit proximity data because the overall number of wires extending from the rail 22 and the number of connectors are reduced. If, however, it is not desirable to communicate proximity information using the computer bus, a proximity sensor connector can be used for redundant output.

The controller 54 is preferably a processing unit such as a personal laptop computer (PLC), however, other controller methods and systems known in the art could also be used. In additional other ancillary or auxiliary devices can be used in conjunction with the PLC. The PLC preferably includes computer card that is designed to interact with the computer bus located in the mating connectors, i.e., rail receivers. The PLC should provide a parallel input output interface and should provide the necessary power for the computer bus. The PLC should also have a keyboard, touch-screen, or other interface known in the art that allows for the set-up of machining jobs.

The PLC should have appropriate software that can be used to allow the operator/user to interface with the system, and which can receive and process data from the sensors located in the fingers of tool mounts. Each finger connector has an identification sensor that is programmed from the receiver connector at the appropriate "teach" time. This will be discussed in greater detail below. If a new finger connector is installed the operator's PLC must issue a learn command or the output signal from the system PLC/controller will not indicate that all conditions are satisfactory to begin the job. The receiver connector position is programmed through the interface between the computer bus and card. For new installations, one receiver connector should be added at a time to the bus. The system controller/PLC 54 will prompt the operator to input the position of the receiver connector as each additional receiver connector is connected to the bus. If there is a system failure, the controller 54 will not recognize the position of the receiver connector and will prompt the operator for position input.

For example, if there are 20 receiver connectors extending along a rail 22, the connectors would be numbered positions one (1) to twenty (20). Assume there are ten (10) different operations that can be performed and the operator is setting up for operation number nine (9) that should use finger connector in rail receiver position three (3). The finger information loaded during "teach" time into the finger identification simply operation nine (9), position three (3).

The system controller 54 provides a control signal indicating whether or not conditions are satisfactory for proceeding with the operation. Thus, the controller 54 sends a signal to the operator's PLC to indicate that all the positions on the rail have the correct finger inserted or have no finger for that specific operation. The system controller 54 also processes data received from the proximity sensors on the fingers and from the proximity of the part to the fingers.

The operator's PLC sends the following information to the system controller 54. As discussed above, the operator inputs the operation number that is to be run so that the rail receiver connectors know what operation should be loaded. The operator also provides a "teach" output for each new finger connector installation. Thus, the operation will have to be completely set-up before a "teach" command can be issued from the operator's PLC. During a "teach," the rail receiver connector will identify the finger connectors that are for that operation and rail receiver connector position. If there is no finger present for the specific rail receiver connector position, the system will remember that there is no finger present for this position at the time of a "teach" command. Thus, if an operation requires a finger at this position, the operation will have to be set-up before the "teach" can occur.

Figure 5:
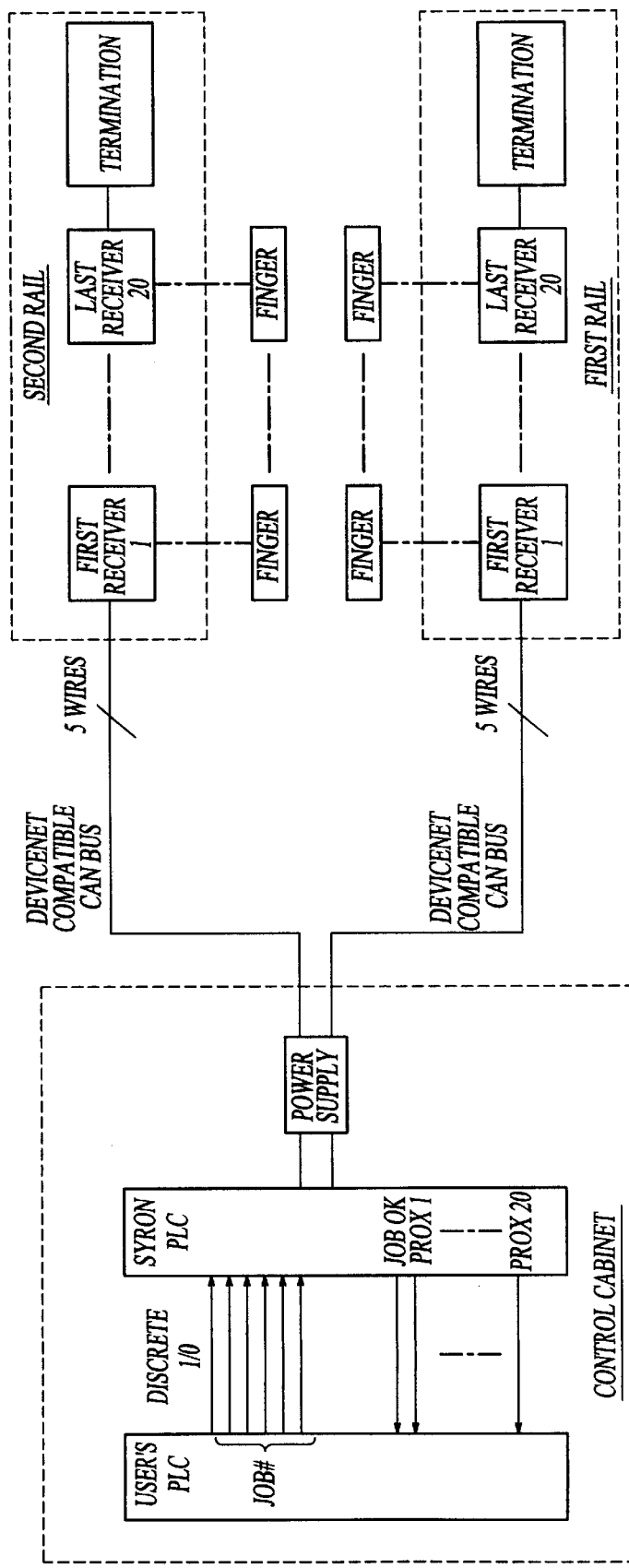
FIG. 5 is a schematic view of the identification code system.

As shown in FIG. 5, a control cabinet 72 can be used to house the system controller 54 and the operator/user's PLC 74. As discussed above, a standard interface 76 known in the art can be used to connect the system 54 and user's 74 PLCs. A common power supply 78 can be used to provide power for the system 54 and user's 74 PLCs as well as the power for the communication systems for the finger and rail connectors.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A mounting system for mounting tools on a base comprising:
    a movable base for moving a part from at least a first operation to a second operation;
    a tool mounting frame for selective attachment to said base and including at least one tool mount supporting a first tool for interaction with the part;
    a locking assembly movable between a locked position where said tool mounting frame is securely attached to said base and an unlocked position where said tool mounting frame is movable relative to said base;
    said locking assembly including a first mount supported by said base, a second mount supported by said tool mounting frame, and an actuator for automatically interlocking said first and second mounts prior to moving the part to an appropriate operation; and
    a first sensor component mounted on said base and a second sensor component mounted on said tool mounting frame with at least one of said first and second sensor components emitting a code and the other of said first and second sensor components sensing said code wherein said locking assembly is moved to said locked position only when said sensed code is appropriate.

2. A mounting system as recited in claim 1 wherein said first mount includes a first connector portion and said second mount includes a second connector portion, said actuator automatically moving said locking assembly to said locked position when one of said first or second connector portions engages the other of said first or second connector portions.

3. A mounting system for mounting tools on a base comprising:
    a movable base for moving a part from at least a first operation to a second operation;
    a tool mounting frame for selective attachment to said base and including at least one tool mount supporting a first tool for interaction with the part;
    a locking assembly movable between a locked position where said tool mounting frame is securely attached to said base and an unlocked position where said tool mounting frame is movable relative to said base:
    said locking assembly including a first mount supported by said base, a second mount supported by said tool mounting frame, and an actuator for automatically interlocking said first and second mounts prior to moving the part to an appropriate operation wherein said first mount includes a first connector portion and said second mount includes a second connector portion, said actuator automatically moving said locking assembly to said locked position when one of said first or second connector portions engages the other of said first or second connector portions and wherein said first connector portion is comprised of at least one fork member and said second connector portion is comprised of at least one pin having an engagement portion for interacting with said fork member.

4. A mounting system as recited in claim 3 wherein said fork member is actuated by a piston to engage said engagement portion and draw said pin towards said first mount to move said locking assembly to said locked position.

5. A mounting system as recited in claim 3 wherein said fork member includes an angled surface for drawing said pin into said first mount as said first and second mounts are interlocked.

6. A mounting system for mounting tools on a base composing:
    a movable base for moving a pail from at least a first operation to a second operation;
    a tool mounting frame for selective attachment to said base and including at least one tool mount supporting a first tool for interaction with the part;
    a locking assembly movable between a locked position where said tool mounting frame is securely attached to said base and an unlocked position where said tool mounting frame is movable relative to said base, said locking assembly including a first mount supported by said base, a second mount supported by said tool mounting frame, and an actuator for automatically interlocking said first and second mounts prior to moving the part to an appropriate operation;
    a first sensor component mounted on said base;
    a second sensor component mounted on said tool mounting frame; and
    a controller for selecting a first type of tool mounting frame wherein said controller controls the speed of said first type of tool mounting frame relative to said base as said first type of tool mounting frame is mounted to said base based on proximity of said first sensor component to said second sensor component.

7. A method for mounting tools on a base comprising the steps of:
    (a) providing a movable base for moving a part from at least a first operation to a second operation with a first mount, and providing the first mount with at least one fork;
    (b) mounting a first tool mounting frame having a second mount to the base, and providing the second mount with at least one pin member having an engagement portion for interacting with the fork; and
    (c) automatically locking the first mount to the second mount to securely hold the first tool mounting frame fixed relative to the base prior to moving the part to an appropriate operation wherein locking the first mount to the second mount includes sliding the fork into engagement with the engagement portion of the pin member.

8. A method as recited in claim 7 including the steps of detaching the first tool mounting frame after completing the first tool operation, mounting a second tool mounting frame having a second tool different than the first tool to the base, automatically locking the second tool mounting frame to the base, and performing a second tool operation with the second tool.

9. A method for mounting tools on a base comprising the steps of:
    (a) providing a movable base for moving a part from at least a first operation to a second operation with a first mount;

(b) mounting a first tool mounting frame having a second mount to the base; and (c) automatically locking the first mount to the second mount to securely hold the first tool mounting frame fixed relative to the base prior to moving the part to an appropriate operation;

(d) detaching the first tool mounting frame after completing the first operation, mounting a second tool mounting frame having a second tool different than the first tool to the base, automatically locking the second tool mounting frame to the base, and performing a second tool operation with the second tool; and (e) mounting a first sensor component to the movable base, mounting a second sensor component to the first tool mounting frame, mounting a third sensor component to the second tool mounting frame, controlling the speed of the first tool mounting frame relative to the base during step (b) based on proximity of the first and second sensor components, and controlling the speed of the second tool mounting frame relative to the base during step (d) based on proximity of the first and third sensor components.

10. A method for mounting tools on a base comprising the steps of:

(a) providing a movable base for moving a part from at least a first operation to a second operation with a first mount;

(b) mounting a first tool mounting frame having a second mount to the base; and (c) automatically locking the first mount to the second mount to securely hold the tool mounting frame fixed relative to the base prior to moving the part to the appropriate operation;

(d) detaching the first tool mounting frame after completing the first tool operation, mounting a second tool mounting frame having a second tool different than the first tool to the base, automatically locking the second tool mounting frame to the base, and performing a second tool operation with the second tool; and (e) generating a first code corresponding to the first tool mounting frame, sensing the first code, mounting the first tool mounting frame to the movable base only when the first code is appropriate, generating a second code corresponding to the second tool mounting frame that is unique from the first code, sensing the second code, and mounting the second tool mounting frame to the movable base only when the second code is appropriate.

11. A removable tool mounting frame system for selectively attaching different tool types to a movable base comprising:

a first rail assembly including at least one tool mount for supporting a first tool;

a second rail assembly including at least one tool mount for supporting a second tool different than said first tool;

a controller for generating a control signal indicating which of said first or second rail assemblies will be attached to a movable base; and a first locking mount supported on said first rail assembly for automatic locking attachment to the movable base and a second locking mount supported on said second rail assembly for automatic locking attachment to the movable base, said first and second locking mounts being operable in response to receipt of said control signal.

12. A system as recited in claim 11, including a first sensor component mounted to said first rail assembly for emitting a first code unique to said first tool and a second sensor component mounted to said second rail assembly for emitting a second code unique to said second tool to ensure that the correct type of tool is mounted to the base.

13. A mounting system for mounting tools to a base comprising:

a movable base having a first sensor assembly with a first sensor proximity component;

a tool mounting frame for selective attachment to said base and including a second sensor assembly with a second sensor proximity component and at least one tool mount for supporting a first tool; and a controller for selectively mounting said tool mounting frame to said base and for controlling the speed of said tool mounting frame relative to said base during mounting based on proximity of said first and second sensor proximity components.

14. A system as recited in claim 13, wherein said first sensor assembly includes a first sensor identification component that emits a first code unique to said base and said second sensor assembly includes a second sensor identification component that emits a second code unique to said tool mounting frame where said tool mounting frame is automatically locked to said base only when said first and second codes are compatible.

15. A system as recited in claim 14 including a locking assembly movable between a locked position where said tool mounting frame is securely attached to said base and an unlocked position where said tool mounting frame is movable relative to said base wherein said controller receives and compares said first and second codes to produce a control signal for controlling said locking assembly.

16. A method for mounting tools to a base comprising the steps of:

(a) mounting a first sensor assembly to a first type of movable base member;

(b) mounting a second sensor assembly to a first type of tool mounting frame;

(c) controlling the speed of the first type of tool mounting frame relative to the base member during selective mounting of the tool mounting frame to the base member based on proximity of the first and second sensor assemblies.

17. A method as recited in claim 16 further including the step of automatically locking the first type of tool mounting frame to the base member.

18. A method as recited in claim 17 further including the steps of emitting a first code unique to the base member, emitting a second code unique to the first type of tool mounting frame, and automatically locking the first type of tool mounting frame to the base member only when the first and second codes are compatible.

19. A method for mounting tools to a base comprising the steps of:

(a) generating a signal representing a code corresponding to a first type of tool mounting frame;

(b) mounting a sensor component to a movable base;

(c) sensing the signal with the sensor component; and (d) mounting the first type of tool mounting frame to the base only when the sensor component senses the code and the code indicates the tool mounting frame is a correct frame.

20. A method as recited in claim 19 including the steps of providing a plurality of tool mounting frames, the codes from the plurality of tool mounting frames each being different.

21. A tool mounting frame comprising:
a rail assembly;
a tool mount area positioned along said rail assembly; and
an emitter supported by said rail assembly for emitting a signal carrying a code unique to said rail assembly.

22. A frame as recited in claim 21 including at least one tool mount for supporting a first type of tool at said tool mount area.

23. A frame as recited in claim 22 wherein said code is based on the first type of tool.

24. A method as recited in claim 7 wherein step (b) further includes mounting a first tool type to the first tool mounting frame to move the part between operations.

25. A frame system as recited in claim 12 including a third sensor component mounted to the movable base and wherein said first sensor component includes a first proximity sensor and said second sensor component includes a second proximity sensor with said controller controlling speed of said first and second rail assemblies relative to the movable base based on the proximity of said first or second proximity sensor to said third sensor component.

26. A frame system as recited in claim 25 wherein said third sensor component senses said first and second codes to identify said first and second rail assemblies prior to locking attachment of said first or second locking mounts.

27. A frame system as recited in claim 11 including at least a third rail assembly having at least one tool mount for supporting a third tool different than said first or second tools and a third locking mount for automatic locking attachment to the movable base in response to said control signal indicating which of said first, second, or third rail assemblies is designated for attachment to the movable base.

28. A frame as recited in claim 22 wherein said at least one tool mount is a plurality of tool mounts each supporting a tool and positioned at a plurality of locations along said tool mount area.

* * * * *

UNITED STATES PATENT AND TRADEMARK OFFICE
CERTIFICATE OF CORRECTION

PATENT NO.    : 6,860,705 B1
DATED         : March 1, 2005
INVENTOR(S)   : Dietrich et al.

It is certified that error appears in the above-identified patent and that said Letters Patent is hereby corrected as shown below:

Column 8,
Line 14, "pail" should be -- part --.

Signed and Sealed this

Twenty-first Day of June, 2005

JON W. DUDAS
*Director of the United States Patent and Trademark Office*